United States Patent
Wilde

(10) Patent No.: US 6,517,140 B2
(45) Date of Patent: Feb. 11, 2003

(54) PICKUP TRUCK TAILGATE WIND DEFLECTOR

(76) Inventor: James W. Wilde, 504 C. 2nd St., Castlerock, CO (US) 80104

( * ) Notice: Subject to any disclaimer, the term of this patent is extended or adjusted under 35 U.S.C. 154(b) by 0 days.

(21) Appl. No.: 10/032,842

(22) Filed: Oct. 20, 2001

(65) Prior Publication Data

US 2002/0053813 A1 May 9, 2002

Related U.S. Application Data

(60) Provisional application No. 60/242,890, filed on Oct. 24, 2000.

(51) Int. Cl.[7] .................................................. B60J 7/00
(52) U.S. Cl. .................................................. 296/130.1
(58) Field of Search .......................... 296/180.1, 180.2, 296/180.5, 50, 51

(56) References Cited

U.S. PATENT DOCUMENTS

| | | | |
|---|---|---|---|
| 4,451,075 A | * | 5/1984 | Canfield ..................... 296/37.6 |
| 4,506,870 A | * | 3/1985 | Penn .......................... 296/37.6 |
| 4,573,730 A | | 3/1986 | Gondert et al. |
| 4,585,263 A | | 4/1986 | Hesner |
| 4,877,283 A | * | 10/1989 | Little et al. ............... 296/180.2 |
| 4,884,838 A | * | 12/1989 | Slater ....................... 296/180.1 |
| 5,058,945 A | * | 10/1991 | Elliot, Sr. et al. ........ 296/180.5 |
| 5,069,498 A | | 12/1991 | Benchoff |
| 5,232,259 A | * | 8/1993 | Booker ...................... 296/37.6 |
| 5,403,059 A | * | 4/1995 | Turner ..................... 296/180.1 |
| 5,435,616 A | | 7/1995 | Corner |
| 5,498,058 A | * | 3/1996 | Kuo .......................... 296/180.1 |
| 5,513,894 A | * | 5/1996 | Ragsdale .................. 296/180.2 |
| 5,551,747 A | | 9/1996 | Larsen |
| 5,722,714 A | * | 3/1998 | Vallerand ................. 296/180.1 |
| 5,735,567 A | | 4/1998 | Mora, Sr. |
| 5,743,589 A | | 4/1998 | Felker |
| 6,206,444 B1 | * | 3/2001 | Casey ......................... 296/50 |

* cited by examiner

*Primary Examiner*—D. Glenn Dayoan
*Assistant Examiner*—G Blankenship
(74) *Attorney, Agent, or Firm*—Brian D. Smith, P.C.

(57) ABSTRACT

A wind deflector for the tailgate of a pickup truck includes a generally rectangular sheet having an exterior and an interior surface which are interconnected by a periphery formed of a long horizontal top edge, a long horizontal bottom edge, and a pair of short side edges extending therebetween. The sheet may be either a flexible fabric material or a rigid material. Top and bottom sets of hook and loop fasteners are provided for attaching the deflector to the bed and tail gate of the pickup truck. The hook fasteners are affixed to the interior surface of the sheet along the sheet's top and bottom edges. The top loop fastener is affixed to the top edge of the tail gate of the pickup truck while the bottom loop fastener is affixed to the floor of the pickup truck bed. In addition, the loop fasteners are spaced from each other a distance which approximates the length of the short side edges of the sheet. When the top and bottom sets of hoop and loop fasteners are pressed together into engagement the deflector will be securely attached to the bed and tailgate of the pickup truck and thereby in position to serve as a wind deflector for tailgate of the pickup truck.

17 Claims, 3 Drawing Sheets

PICKUP TRUCK TAILGATE WIND DEFLECTOR

CROSS REFERENCE TO RELATED APPLICATION

This application is a nonprovisional application claiming the benefit under 35 USC 119(e) of U.S. provisional application Ser. No. 60/242,890, filed on Oct. 24, 2000.

BACKGROUND OF THE INVENTION

1. Field of the Invention

The present invention relates to methods and apparatus for deflecting wind in the bed of a moving pickup truck and more particularly to apparatus for being easily installed and removed from pickup truck beds and methods enabling such.

2. Description of the Prior Art

The use of pickup truck air foil apparatuses is known in the prior art. More specifically, pickup truck air foil apparatuses heretofore devised and utilized for the purpose of reducing air pressure and wind drag forces in a bed of a moving pickup truck are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,411,312 to Stallings discloses a tailgate wind deflector apparatus. U.S. Pat. No. 5,232,259 to Booker discloses a truck bed air deflecting tool box. U.S. Pat. No. 5,069,498 to Benchoff discloses a pickup truck retractable endgate airfoil. U.S. Pat. No. 4,884,838 to Slater discloses a combined airfoil and loading ramp for a pickup truck. U.S. Pat. No. 4,585,263 to Hesner discloses an air deflector. U.S. Pat. No. Des. 351,819 to Baddeley discloses a combined pickup truck air deflector and storage cover.

While the devices undoubtedly work as intended, the aforementioned patents describing these devices do not describe or suggest a tailgate deflector apparatus that is quickly and easily installed and removed from the tailgate and bed of a pickup truck.

In this respect, the tailgate wind deflector according to the present invention substantially departs from the conventional concepts and designs of the prior art, and in doing so provides an apparatus primarily developed for quick installation and removal from the tailgate and bed of a pickup truck.

SUMMARY OF THE INVENTION

In view of the foregoing, the present invention provides a tailgate wind deflector apparatus for use in a bed of a pickup truck that is quickly and easily installed and removed from the tailgate and bed of a pickup truck. To attain this, the present invention comprises a generally rectangular sheet made of either flexible or rigid material having an exterior surface and an interior surface. The interior and exterior surfaces are interconnected by a periphery formed of a long horizontal top edge, a long horizontal bottom edge, and a pair of short side edges extending therebetween.

Top and bottom sets of fasteners for attaching the deflector to the bed and tail gate of the pickup truck are also provided, each of which includes first and second releasable fasteners for engaging and disengaging each other. The first fastener of the top set is affixed to the interior surface of the sheet along the sheet's top edge thereof while the first fastener of the bottom set is affixed to the interior surface of the sheet along its bottom edge. The second fastener of the top set is affixed to the top edge of the tail gate of the pickup truck and the second fastener of the bottom set is affixed to the floor of the pickup truck bed. In addition, the second fastener affixed to the truck bed floor is attached to the floor at a location where its distance from the second fastener affixed to the tail gate is generally equal to the length of the short side edges of said rectangular sheet.

When the first and second fasteners of the top and bottom set are pressed together (or otherwise caused to engage each other) the deflector will be securely attached to the bed and tailgate of the pickup truck and thereby in position to serve as a wind deflector for the tailgate of the pickup truck when the truck is driven.

There has thus been outlined, rather broadly, the important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining the disclosed embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DETAILED DESCRIPTION OF PREFERRED EMBODIMENTS

Figure 1:
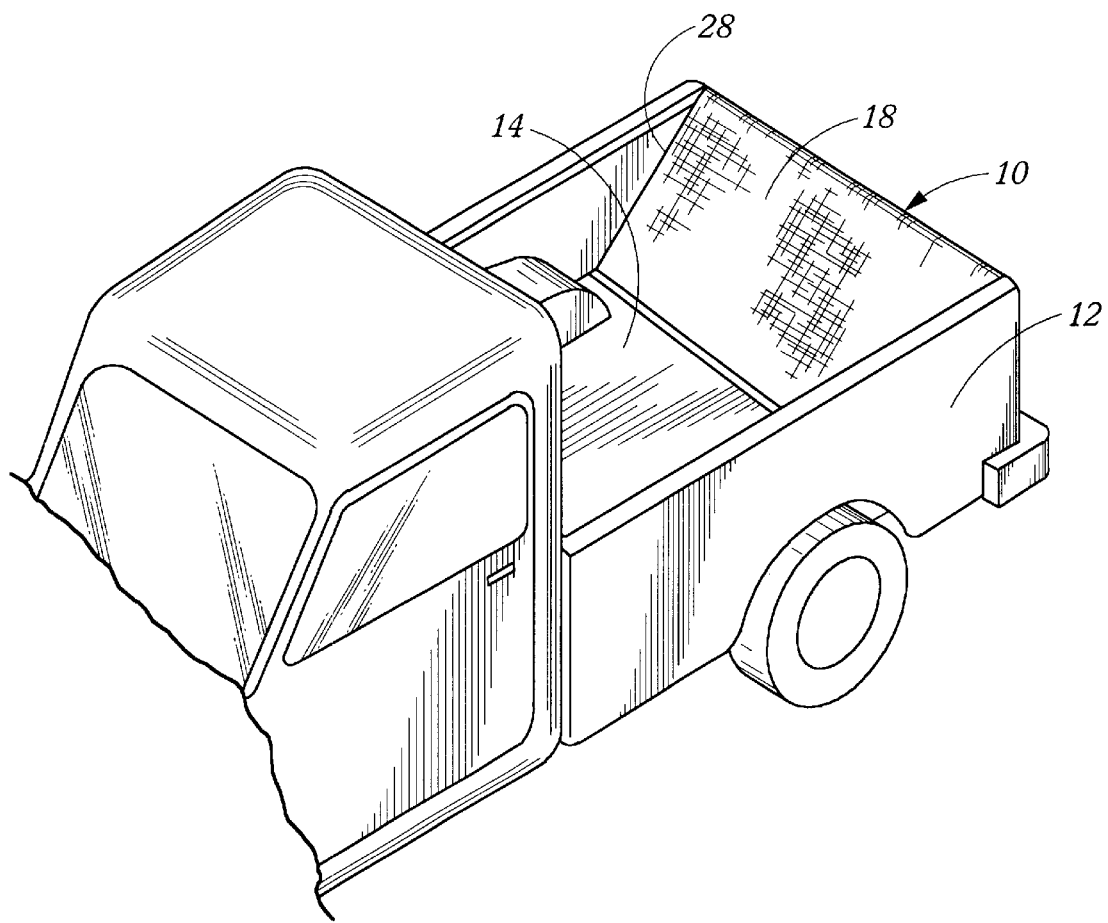
FIG. 1 is a perspective view of an embodiment of the present invention showing the embodiment installed on a pickup truck.
Figure 2:
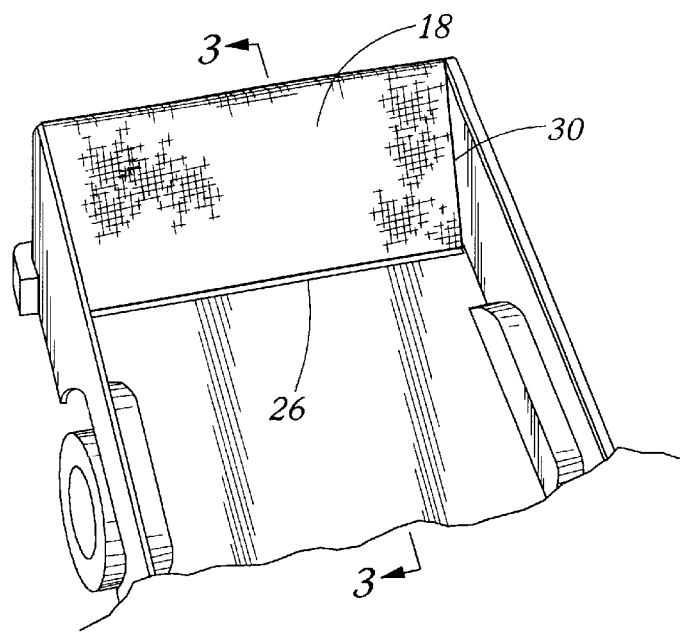
FIG. 2 is another perspective view of the embodiment of FIG. 1 taken, however, more from the top rather than the side view of FIG. 1.
Figure 3:
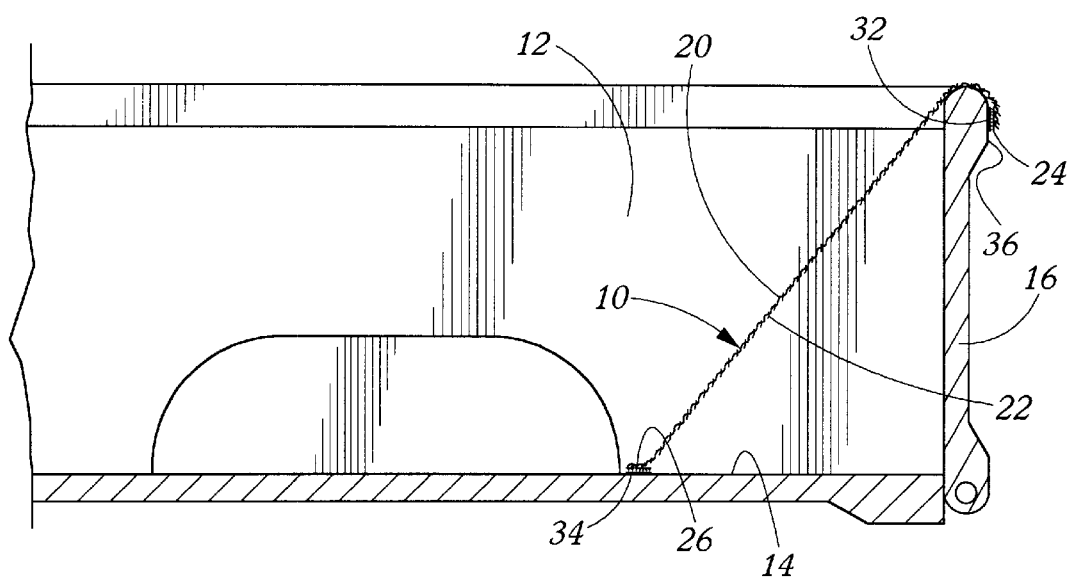
FIG. 3 is a cross-sectional view taken along lines 3—3 of FIG. 3.

Referring now to the drawings, FIGS. 1–3 shows a wind deflector apparatus or tailgate deflector 10 of the present invention for use in pickup truck bed 12 having a floor 14 and a tail gate 16. As shown, deflector 10 comprises a generally rectangular sheet 18 (of fabric or flexible plastic) having an exterior surface 20 and an interior surface 22. As also shown, surfaces 18, 20 are interconnected by a periphery formed of a long horizontal top edge 24, a long horizontal bottom edge 26, and a pair of short side edges 28, 30 extending therebetween. Top and bottom sets 32, 34 of releasable fasteners are also provided, each of which includes first and second releasable fasteners such as hook and loop fasteners (not numbered) for engaging and disengaging each other to enable the sheet to be easily attached to and removed from the pickup truck.

While not shown in detail in the drawings, it will be appreciated by those skilled in the art that the first fastener of the top fastening set 32, preferably a hook fastener, is affixed, preferably sewn, to the interior surface 22 of the sheet along its top edge 24. Similarly, the first fastener of the bottom set 34, also preferably a hook fastener, is affixed, also preferably sewn, to the interior surface of the sheet along bottom edge 26. The second fasteners, preferably loop fasteners, of said top and bottom fastening sets are affixed, preferably by use of an adhesive, to the truck.

As best shown in FIG. 2, the second fastener of the top fastening set 32 is affixed to the outwardly facing top edge surface 36 of the truck's tail gate while the second fastener of the bottom set 34 is affixed to the floor 14 of the pickup truck bed. As shown, the second fastener of the bottom set is affixed to the floor at a location so that its distance from the second fastener affixed to the tail gate is generally equal to the length of the short side edges 28, 30 of the rectangular sheet. In this way, it will be appreciated that when sheet 18 is attached to the truck bed by pressing the hook and loop fasteners together sheet 18 will be tightly attached to the truck bed. If sheet 18 is made from a fabric material such as pack cloth locating the second fasteners as described will provide a taut attachment of the sheet to the truck. Such a taut attachment is desirable since it will help prevent the sheet from being blown out of the truck when the sheet is subjected to high winds which will occur when the truck is driven at a high speed.

Figure 4:
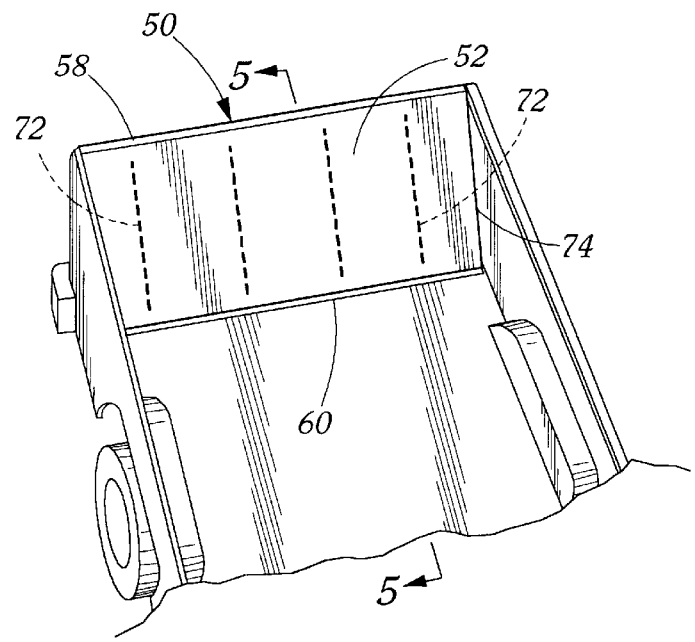
FIG. 4 is a perspective view of another embodiment of the present invention taken from the same angle as that of FIG. 2.
Figure 5:
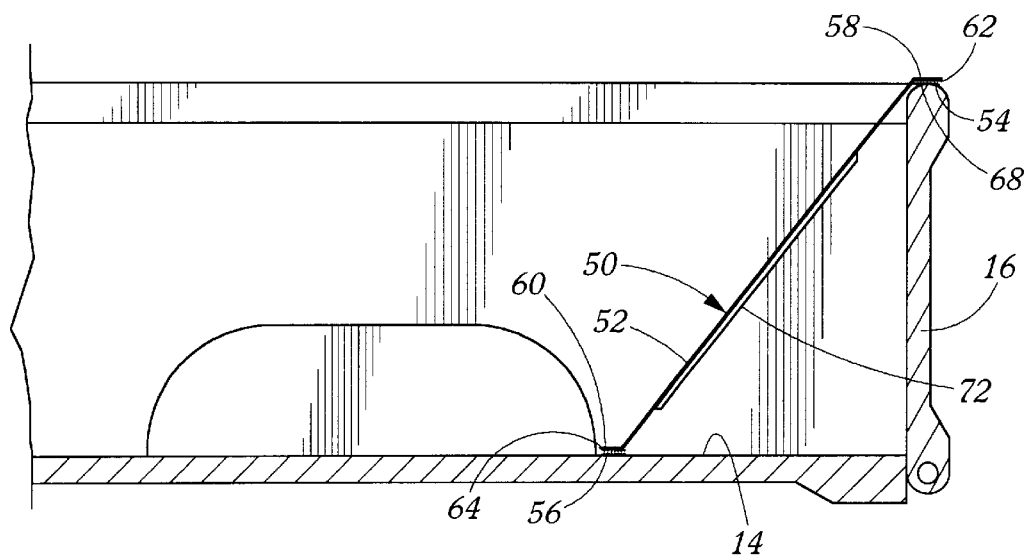
FIG. 5 is a cross-sectional view taken along lines 5—5 of FIG. 4.

FIGS. 4–5 illustrate a deflector 50 of the present invention which is similar to that of FIGS. 1–3 but which is made from a generally rigid sheet 52 of material such as high density polyethylene, ABS plastic or even metal instead of the flexible fabric material of FIGS. 1–3. As with deflector 10, deflector 50 is attached to the pickup truck with top and bottom fastening sets 54, 56 which are preferably hook and loop fasteners such as those employed in the first embodiment. To insure that the hook and loop fasteners are capable of securely engaging each other when pressed together, deflector 50 is provided with parallel top and bottom edge sections 58, 60 (located respectively along said sheet's top and bottom edges 62, 64) to which the hook fasteners are attached. The parallel orientation of the edge sections helps to insure that the edge sections will be parallel with the surfaces of the truck bed floor 14 and the upwardly facing top edge surface 68 of the truck's tailgate 16 when the deflector is installed on the vehicle. In addition, since sheet 52 is preferably made from a rigid material such as ABS plastic, the hook fasteners are preferably glued to the interior surfaces of edge sections 58, 60 with an adhesive instead of being sewn as the hook fasteners of FIGS. 1–3 are. Finally, as also shown in FIGS. 4–5, sheet 52 is provided with 4 parallel strengthening ribs 72 on its interior surface which as indicated serve to strengthen sheet 52. Ribs 72 are preferably integral with sheet 52 and made from the same material as sheet 52.

To install deflector 50 on a vehicle, one first affixes the loop fastener of the top set 54 to the top edge surface 68 of the tail gate 16 of the pickup truck as such is shown in FIG. 5. One then affixes the loop fastener of the bottom fastening set 56 to the floor of the pickup truck bed at a location where its distance from the loop fastener affixed to the tail gate is generally equal to the length of the short side edges 74 of sheet 52. The deflector is then attached to the bed of the pickup truck so that it serves as a wind deflector by simply pressing the hook and loop fasteners of the top and bottom sets together so that the hook and loop fasteners engage each other. As will be appreciated, the deflector can be easily removed from the pickup truck bed and tailgate by simply pulling the hook and loop fasteners of top and bottom attaching members 54, 56 apart until they disengage each other. The deflector may then be removed from the pickup truck.

With respect to the above description, it shall be understood that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

I claim:

1. A wind deflector apparatus for use in a pickup truck bed having a bed floor and a tail gate with a top edge, said apparatus comprising:

a generally rectangular sheet having an exterior surface and an interior surface which are interconnected by a periphery formed of a long horizontal top edge, a long horizontal bottom edge, and a pair of short side edges extending therebetween; and top and bottom sets of first and second releasable fasteners for engaging and disengaging each other, said first fastener of said top set being affixed to said interior surface of said rectangular sheet along said top edge thereof and said first fastener of said bottom set being affixed to said interior surface of said rectangular sheet along said bottom edge thereof, said first fasteners engaging said second fasteners to attach said rectangular sheet to the bed of the pickup truck so that it serves as a wind deflector when said second fastener of said top set is affixed to the top edge of a tail gate of a pickup truck and said second fastener of said bottom set is affixed to the floor of the pickup truck bed at a location where its distance from the second fastener affixed to the tail gate is generally equal to the length of the short side edges of said rectangular sheet.

2. A wind deflector apparatus as claimed in claim 1 wherein said rectangular sheet is flexible so that it is capable of being rolled up or folded.

3. A wind deflector apparatus as claimed in claim 2 wherein said flexible rectangular sheet is made from a member selected from the group comprising fabric and flexible plastic.

4. A wind deflector apparatus as claimed in claim 1 wherein said rectangular sheet is generally rigid and provided with top and bottom edge sections located respectively along said sheet's top and bottom edges, said top and bottom edge sections being generally parallel to each other with said first fastener of said top set being affixed to the interior surface of said top edge section and said first fastener of said bottom set being affixed to the interior surface of said bottom edge section.

5. A wind deflector apparatus as claimed in claim 4 wherein said rigid rectangular sheet is made from a member selected from the group comprising metal and hard plastic.

6. A wind deflector apparatus as claimed in claim 1 wherein each said set includes hook and loop fasteners.

7. A wind deflector apparatus as claimed in claim 6 wherein said first fasteners include said hook fasteners and said second fasteners include said loop fasteners.

8. An improved pickup truck having a truck bed and a tail gate, said improvement comprising:
 a generally rectangular sheet having an exterior surface and an interior surface which are interconnected by a periphery formed of a long horizontal top edge, a long horizontal bottom edge, and a pair of short side edges extending therebetween; and
 top and bottom sets of first and second releasable fasteners for engaging and disengaging each other, said first fastener of said top set being affixed to said interior surface of said rectangular sheet along said top edge thereof, said first fastener of said bottom set being affixed to said interior surface of said rectangular sheet along said bottom edge thereof, said second fastener of said top set being affixed to the top edge of said tail gate of the pickup truck and said second fastener of said bottom set being affixed to the floor of the pickup truck bed at a location where its distance from the second fastener affixed to the tail gate is generally equal to the length of the short side edges of said rectangular sheet, said first fasteners engaging said second fasteners to attach said rectangular sheet to said bed of the pickup truck so that said sheet serves as a wind deflector for the tailgate of the pickup truck.

9. An improved pickup truck as claimed in claim 8 wherein said rectangular sheet is flexible so that it is capable of being rolled up or folded.

10. An improved pickup truck as claimed in claim 9 wherein said flexible rectangular sheet is made from a member selected from the group comprising fabric and flexible plastic.

11. An improved pickup truck as claimed in claim 8 wherein said rectangular sheet is generally rigid and provided with top and bottom edge sections located respectively along said sheet's top and bottom edges, said top and bottom edge sections being generally parallel to each other with said first fastener of said top set being affixed to the interior surface of said top edge section and said first fastener of said bottom set being affixed to the interior surface of said bottom edge section.

12. An improved pickup truck as claimed in claim 11 wherein said rigid rectangular sheet is made from a member selected from the group comprising metal and hard plastic.

13. An improved pickup truck as claimed in claim 8 wherein each said set includes hook and loop fasteners.

14. An improved pickup truck as claimed in claim 13 wherein said first fasteners include said hook fasteners and said second fasteners include said loop fasteners.

15. A method of installing and removing a wind deflector apparatus in a pickup truck bed having a bed floor and a tail gate with a top edge, said method comprising:
 providing a wind deflector apparatus including:
  a generally rectangular sheet having an exterior surface and an interior surface which are interconnected by a periphery formed of a long horizontal top edge, a long horizontal bottom edge, and a pair of short side edges extending therebetween; and
  top and bottom sets of first and second releasable fasteners for engaging and disengaging each other, said first fastener of said top set being affixed to said interior surface of said rectangular sheet along said top edge thereof and said first fastener of said bottom set being affixed to said interior surface of said rectangular sheet along said bottom edge thereof;
 affixing the second fastener of said top set to the top edge of a tail gate of a pickup truck;
 affixing the second fastener of said bottom set to the floor of the pickup truck bed at a location where its distance from the second fastener affixed to the tail gate is generally equal to the length of the short side edges of said rectangular sheet;
 attaching the rectangular sheet to the bed of the pickup truck so that it serves as a wind deflector by causing the first and second fasteners of the top set to engage each other and by causing the first and second fasteners of the bottom set to engage each other; and
 removing the rectangular sheet from the bed of the pickup truck by disengaging the first fasteners from the second fasteners and then removing the sheet from the pickup truck.

16. A method as claimed in claim 15 wherein said first and second fasteners are caused to engage each other by pressing them together.

17. A method as claimed in claim 15 wherein said first and second fasteners are disengaged from each other by pulling them apart.

* * * * *